United States Patent
Scodro (10) Patent No.: US 11,767,636 B2
(45) Date of Patent: *Sep. 26, 2023

(54) PROCESS FOR TREATING DREGS, TREATED DREGS, USE THEREOF, PROCESS FOR VULCANIZING RUBBER, AND VULCANIZED RUBBER

(71) Applicant: OXITEC Participação e Gestão de Ativos não Financeiros Ltda., Santana de Parnaíba (BR)

(72) Inventor: Sandro Antônio Scodro, Santana de Parnaíba (BR)

(73) Assignee: OXITEC PARTICIPAÇÃO E GESTÃO DE ATIVOS NÃO FINANCEIROS LTDA., Santana de Parnaiba (BR)

(*) Notice: Subject to any disclaimer, the term of this patent is extended or adjusted under 35 U.S.C. 154(b) by 106 days.

This patent is subject to a terminal disclaimer.

(21) Appl. No.: 17/502,465

(22) Filed: Oct. 15, 2021

(65) Prior Publication Data

US 2022/0034033 A1 Feb. 3, 2022

Related U.S. Application Data

(63) Continuation of application No. 16/338,155, filed as application No. PCT/BR2017/050283 on Sep. 27, 2017, now Pat. No. 11,306,436.

(30) Foreign Application Priority Data

Sep. 30, 2016 (BR) .......................... 102016022898-0

(51) Int. Cl.
  *D21C 11/00* (2006.01)
  *C08J 3/24* (2006.01)
  *C08K 13/02* (2006.01)

(52) U.S. Cl.
  CPC ............ *D21C 11/0078* (2013.01); *C08J 3/24* (2013.01); *C08K 13/02* (2013.01); *C08J 2307/00* (2013.01); *C08J 2309/02* (2013.01); *C08J 2309/06* (2013.01)

(58) Field of Classification Search
  CPC ........................................................ C08J 3/24
  See application file for complete search history.

(56) References Cited

U.S. PATENT DOCUMENTS 11,306,436 B2 * 4/2022 Scodro .................... C08L 25/06
2011/0244233 A1 10/2011 Brown

FOREIGN PATENT DOCUMENTS

| BR | 9916397 B1 | 11/2008 |
| CN | 1201778 A | 12/1998 |
| CN | 2841749 Y | 11/2006 |
| CN | 103833488 A | 6/2014 |
| CN | 204470266 U | 7/2015 |
| JP | 2000302955 A | 10/2000 |
| JP | 2000313791 A | 11/2000 |
| RU | 95108169 A | 3/1997 |
| WO | 2015140003 A1 | 9/2015 |

OTHER PUBLICATIONS

International Search Report and Written Opinion for International Application No. PCT/BR2017/050283, dated Oct. 31, 2017, 13 pages.
International Preliminary Report on Patentability for International Application No. PCT/BR2017/050283, dated Jun. 6, 2018, 4 pages.
English Translation of Applicant's Reply to Written Opinion for International Application No. PCT/BR2017/050283, dated May 16, 2018, 11 pages.

* cited by examiner

*Primary Examiner* — Michael F Pepitone
(74) *Attorney, Agent, or Firm* — Armstrong Teasdale LLP (57) ABSTRACT

Provided herein is a process for treating dregs for the application thereof as vulcanization activator of rubbers, putting an end to this residue generated in the cellulose industry and providing vulcanized rubbers with similar or enhanced properties in relation to those already known. The process for treating dregs includes the steps of: (a) drying the dregs; and (b) micronization of the dry dregs to an average particle size (d50) from 2 to 45 micrometers. Further provided herein are treated dregs, a use of treated dregs as vulcanization activator, and a process for vulcanizing rubber and the vulcanized rubber.

11 Claims, 3 Drawing Sheets

PROCESS FOR TREATING DREGS, TREATED DREGS, USE THEREOF, PROCESS FOR VULCANIZING RUBBER, AND VULCANIZED RUBBER

CROSS-REFERENCE TO RELATED APPLICATIONS

This application is a continuation application of U.S. Pat. No. 11,306,436, filed Sep. 18, 2019, which is a U.S. National Phase Application of PCT/BR2017/050283, filed Sep. 27, 2017, which claims the benefit of priority to BR Application No. 102016022898-0, filed Sep. 30, 2016, the contents of which are hereby expressly incorporated by reference in their entirety.

FIELD OF THE INVENTION

The present invention refers to a process for treating dregs, which is a residue generated in the cellulose production process, for application as vulcanization activator. The invention also refers to treated dregs, to the use of treated dregs, to the process for vulcanizing rubber and to vulcanized rubber using treated dregs.

BACKGROUND OF THE INVENTION

The cellulose production process generally comprises placing wood chips into a digester tank in the presence of cooking liquor, which basically consists of an aqueous solution of sodium hydroxide and sodium sulfide, the objective of this step being to separate the cellulose from the lignin, whereby obtaining the cellulose. The separated lignin is incorporated into the liquor which is thereafter called black liquor. The black liquor follows onto the recovery boiler, where it will be burned and the heat formed will be employed to generate heat and consequently energy. The subproduct from the boiler is then treated with a diluted current of caustic soda and sodium sulfide thus forming the green liquor, resulting from the incomplete burning of the solubilized black liquor in the boiler; sodium carbonate ($Na_2CO_3$); and sodium sulfide ($Na_2S$). At this point in the process, a make-up is made by adding sodium salts and sulfur to keep the balance of these elements. Due to the strongly alkaline conditions, a large number of non-procedural mineral elements (as Al, Mg, Mn, Fe, Co, P, Si, Ca, Na) contained in the green liquor, it is precipitated, and this material is removed in the clarification of the green liquor and referred to as dregs. The dregs can be removed, for example, by using a filter. The green liquor follows on in the kraft process for caustification and formation of the white liquor (NaOH/$Na_2OH$) to return to the digester tank in the initial step as cooking liquor.

The dregs, which as indicated above, is the name given to one of the residues generated by the cellulose industry, specifically to the residue generated in the clarification of the green liquor in the kraft process of obtaining cellulose, are a dark-colored, pasty and slightly granular material, generally presenting consistencies between 35 and 60%. Owing to the strongly alkaline process conditions, the dregs have a high pH varying from 11 to 13.

The generation of dregs in the cellulose production process depends on various factors of process and equipment, varying between 7 and 15 kg per ton of cellulose produced. In 2015, cellulose production in Brazil was 17.2 million tons, and, consequently, the generation of dregs in Brazil in 2015 can be estimated at 200 thousand tons. It should be remembered that more modern cellulose production units work on a scale of 1.5 million tons of cellulose. So a plant of this size generates around 15 thousand tons of dregs.

Therefore, a major challenge for the sector is to eliminate the residue generated in a sustainable fashion. Today, the dregs are mixed with other residues (gritz, boiler ash and lime kiln) to be used in the treatment of soils and in preparing the planting of *eucalyptus* forests. This is the use most employed by industry, but owing to the large volume of material, does not solve the problem.

One alternative is the use of dregs during the rubber vulcanization process. In Brazil, with regard solely to natural rubber—NR, annual consumption can be estimated at approximately 365,000 tons and has broad application on the tires market. The annual consumption of synthetic rubber of approximately 400,000 tons, taking the annual consumption of rubbers in Brazil to 765,000 tons.

The main synthetic rubbers commercialized in the Brazilian market are: styrene-butadiene rubber (SBR); ethylene-propylene dimer rubber (EPDM), polybutadiene rubber (BR); and nitrile rubbers (NBR), such as for example acrylonitrile butadiene rubber, and nitrile butadiene rubber. These rubbers account for approximately 87% of the market of synthetic rubber in Brazil.

The rubber is formed by an elastomeric material which, when placed under certain special conditions of temperature, pressure and time, undergoes an alteration in its rheological behavior, changing from a plastic condition to an elastic condition. This transformation process is called vulcanization, where the sulfur reacts with certain initiation points of the elastomer forming crosslinks between two or more polymer chains, whereby altering its rheological behavior. The general reaction of vulcanization is as follows:

boi natural rubber borracha vulcaniza vulcanized rubber

A vulcanization system contains sulfur, metal oxides, difunctional compounds and/or peroxides and, if necessary, accelerators, activators, retardants, reinforcement loads (or filler), etc., used to produce the desirable vulcanization characteristics and the desired properties of the vulcanized rubber.

The vulcanization time is decreased by including cure accelerators. Products such as thiazoles, dithiocarbamates and amine aldehydes are commonly employed for this purpose.

Metal cation oxides, such as that of zinc (ZnO) and that of magnesium (MgO), for example, are employed as activators. Said cations interact with the accelerators forming sulfurization compounds that accelerate the vulcanization process. Among the metal cation oxides, zinc oxide is the product most employed as activator. Usually, the zinc oxide is used in combination with a fatty acid, such as stearic acid, the zinc ions having become soluble by the formation of the salt coming from the chemical reaction between the acid and the oxide. In particular, the fatty acids and the zinc oxide are incorporated to form a zinc salt, working as a donor or zinc ions that activate the vulcanization system. However, the low affinity of the zinc oxide with the majority of the elastomers means that efforts are made to decrease the dosage in order to improve the incorporation time of the product. Its reduction also contributes to decrease incrustations of zinc sulfide in the mold of vulcanization negatively affecting the yield of the process, by way of lower heat exchange.

The lignin, which is contained in the process of producing paper and cellulose, is an organic and polymer substance having high molecular weight, abundant and important in wood, acting as permanent link agent between the cells generating a resistant structure. In this sense, document CN1044477 A describes the use of the lignin as reinforcement load in the production of rubber, using its natural properties of resistance. Similarly, the articles by Ismail, Rusli and Rashid (2005) (Maleated natural rubber as a coupling agent for paper sludge filled natural rubber composites. *Polymer Testing* 24 (2005) 856-862), Salmah, Ismail, and Abu Bakar (2007) (The Effects of Dynamic Vulcanization and Compatibilizer on Properties of Paper Sludge-Filled Polypropylene/Ethylene Propylene Diene Terpolymer Composites. *Journal of Applied Polymer Science DOI* 10.1002), and Ismail et al (2008) (The Effect of Partial Replacement of Paper Sludge by Commercial Fillers on Natural Rubber Composites. *Journal of Reinforced Plastics and Composites*, Vol. 27, No. 16 17/2008) draws reference to cell fiber residues obtained from the paper manufacturing process as reinforcement loads in the process for vulcanizing rubber.

The carbon black is also a reinforcement load and jointly with silica ($SiO_2$) is one of the loads most used in the production of rubbers. Carbon black is essentially material made of elementary carbon in the form of roughly spherical particles, having a maximum diameter under 1 µm, agglutinated in aggregates, and are produced by converting liquid or gaseous hydrocarbons into elementary carbon and hydrogen, by partial combustion or by heat decomposition.

In the ambit of using the dregs residue generated in the vulcanization process, reference is drawn to document BR102013016060-1, which discloses the use of a product obtained from dry and wet recovery processes, processing and re-utilization of the residue from dregs in the rubber vulcanization process. According to said document, due to the high carbon content of the product obtained, optimal vulcanization is obtained and since the material has an average load content such as limestone, it maintains the mechanical resistance of the rubber produced. The document states that the product obtained acts as a reinforcement load, as well as carbon black which has a high carbon content.

There is, therefore, a demand for the elimination/sustainable application of the dregs, which are the residues generated in the cellulose production process, particularly generated in the clarification of the green liquor in the kraft process, especially in the process for vulcanizing rubber.

Accordingly, it is the objective of the present invention provides an alternative, simple and less laborious process for treating dregs, particularly for the application thereof as vulcanization activator, giving a sustainable end to this residue generated in the cellulose industry, and to provide a product from treated dregs having suitable characteristics to act as a vulcanization activator, and to provide vulcanized rubbers having similar or enhanced properties in relation to those already known.

SUMMARY OF THE INVENTION

The invention refers to a process for treating dregs, which comprises the steps of: (a) drying the dregs; and (b) micronizing of the dregs to an average particle size (d50) from 2 to 45 micrometers.

The invention also refers to treated dregs, to the use of treated dregs as vulcanization activator of rubber, and also focuses on a rubber vulcanization process which comprises the step of adding a vulcanization activator to the rubber (or elastomer) to be vulcanized, wherein the vulcanization activator is the treated dregs, and also on vulcanized rubber containing the treated dregs.

DETAILED DESCRIPTION OF THE INVENTION

Dregs are residues resulting from the precipitation of a large number of non-procedural mineral elements (such as Al, Mg, Mn, Fe, Co, P, Si, Ca, Na), due to the strongly alkaline conditions in the medium, contained in the green liquor that comprises residues generated based on the incomplete burning of the black liquor, sodium carbonate ($Na_2CO_3$) and sodium sulfide ($Na_2S$).

Dregs are comprised of a mixture of metal cation-based oxides, such as, for example, aluminum; of alkaline and earthy alkaline metals such as sodium, magnesium and calcium; transition metals such as manganese, iron and cobalt. The usual composition of the dregs generated in the process of clarification of the green liquor, in % by mass based on the total mass of the composition of the dregs, is:

Loss on Ignition (LOI): 35 to 45;
$SiO_2$: 0.5 to 2.0;
$Al_2O_3$: 0.5 to 1.5;
$Fe_2O_3$: 0.5 to 1.5;
$TiO_2$: 0.0 to 1.0;
CaO: 35 to 50;
MgO: 2 to 20;
$K_2O$: 0.0 to 1.0;
$Na_2O$: 0.5 to 5.0;
$P_2O_5$: 0.2 to 1.5;
BaO: 0.0 to 0.2;
SrO: 0.0 to 0.5;
MnO: 0.1 to 2.0; and
$SO_3$: 0.5 to 5.0.

Bearing in mind the composition of the dregs surprisingly identified that this residue presents the potential to diminish the use of zinc oxide, which is a vulcanization activator, and may also act to diminish the accelerators, as it facilitates the sulfurization reaction, a basic condition for the formation of sulfur crosslinks, that is, vulcanization. Additionally, dregs also have in their composition Silica ($SiO_2$) which is normally employed as a reinforcement agent acting to improve the cohesion of the rubber compound.

Therefore, a process for treating dregs was developed, making them suitable for application as vulcanization activator, being capable of replacing zinc oxide. The process for treating dregs comprises the steps of:

(a) drying the dregs; and
(b) micronizing of the dregs to an average particle size (d50) of 2 to 45 micrometers.

Figure 1:
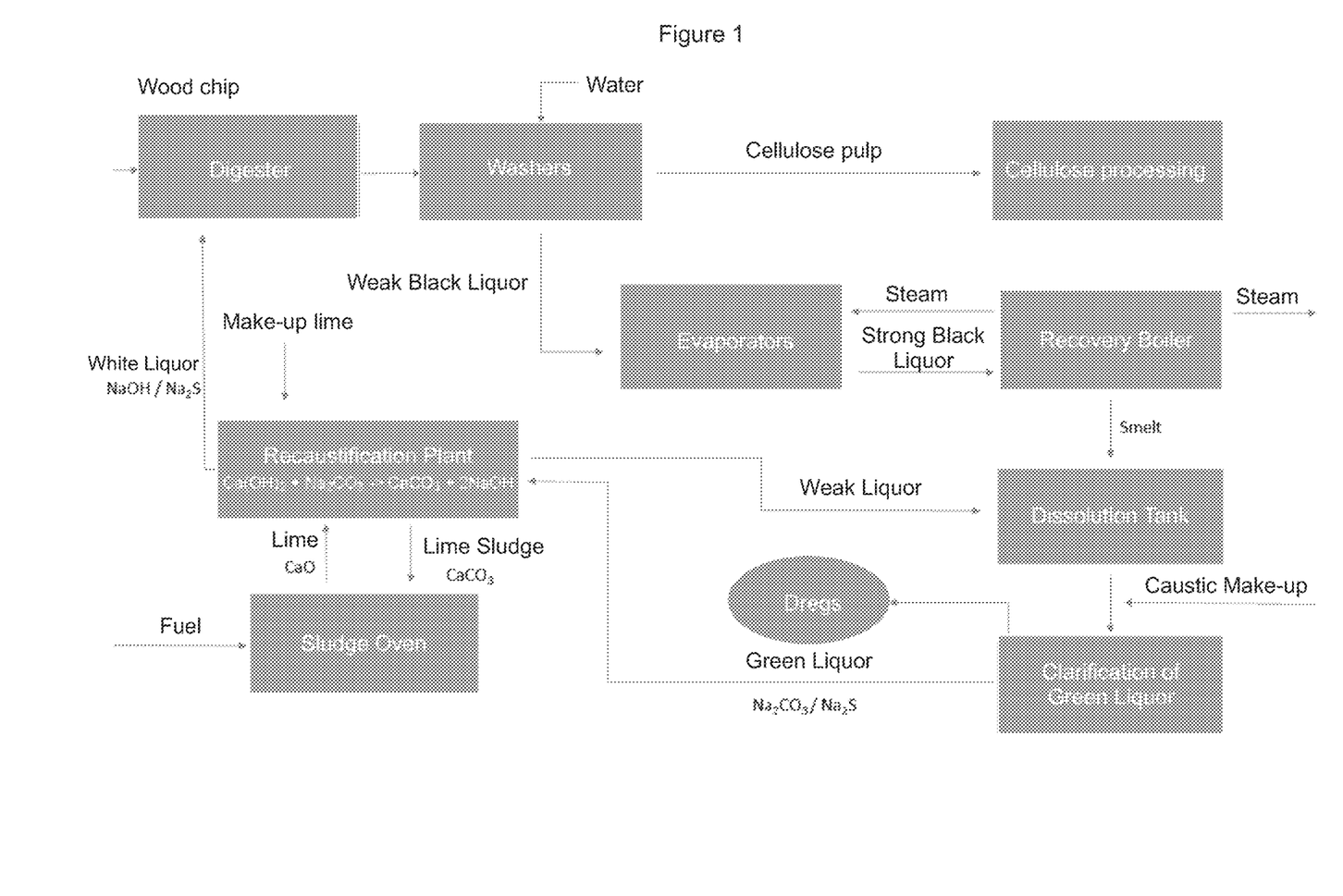
FIG. 1 presents the cycle of sodium and calcium in the production of cellulose, in which the dregs are removed in the clarification of the green liquor kraft ($Na_2CO_3/Na_2S$).
Figure 2:
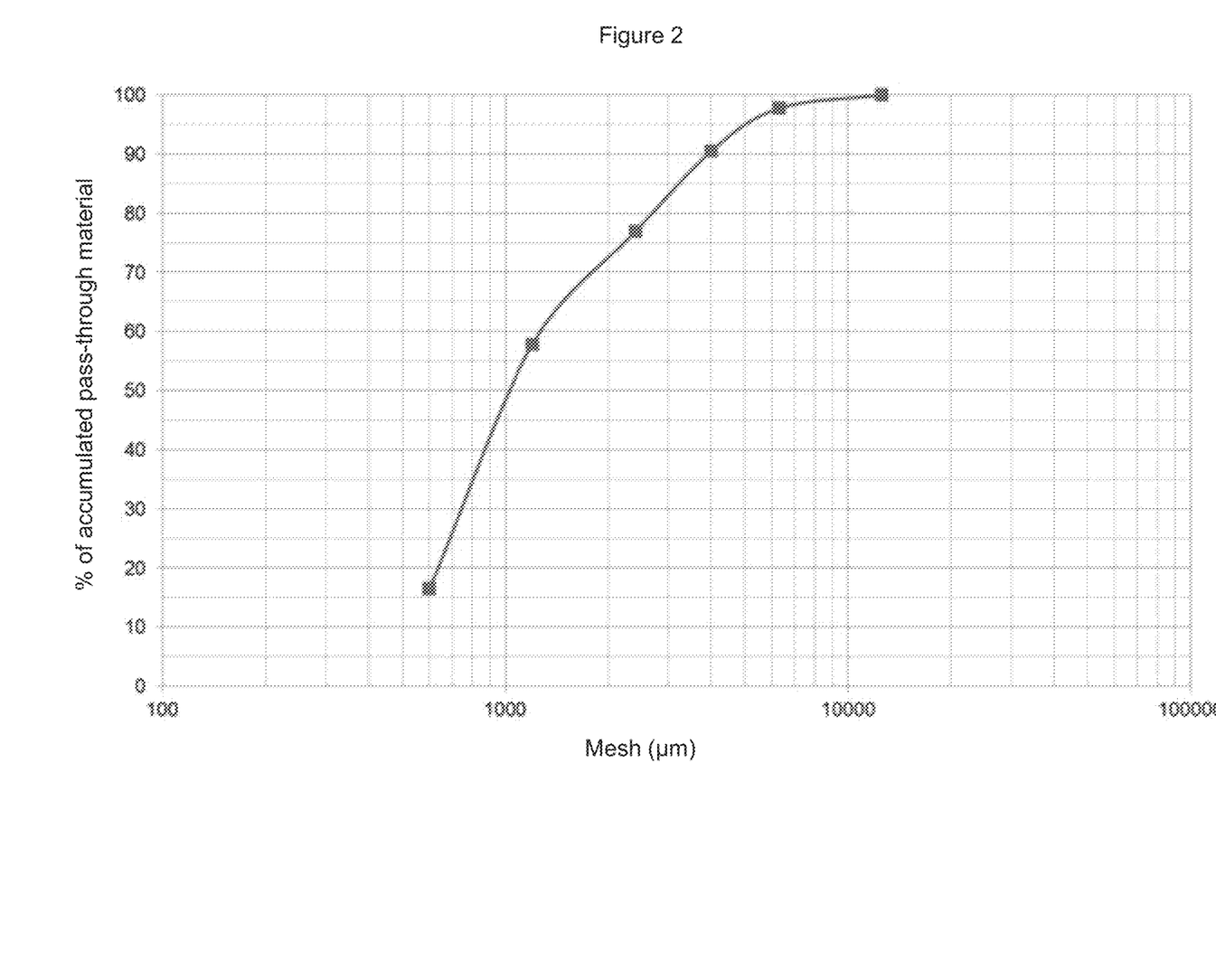
FIG. 2 presents a distribution curve of the particle size of the dregs that enter into the process of the invention.
Figure 3:
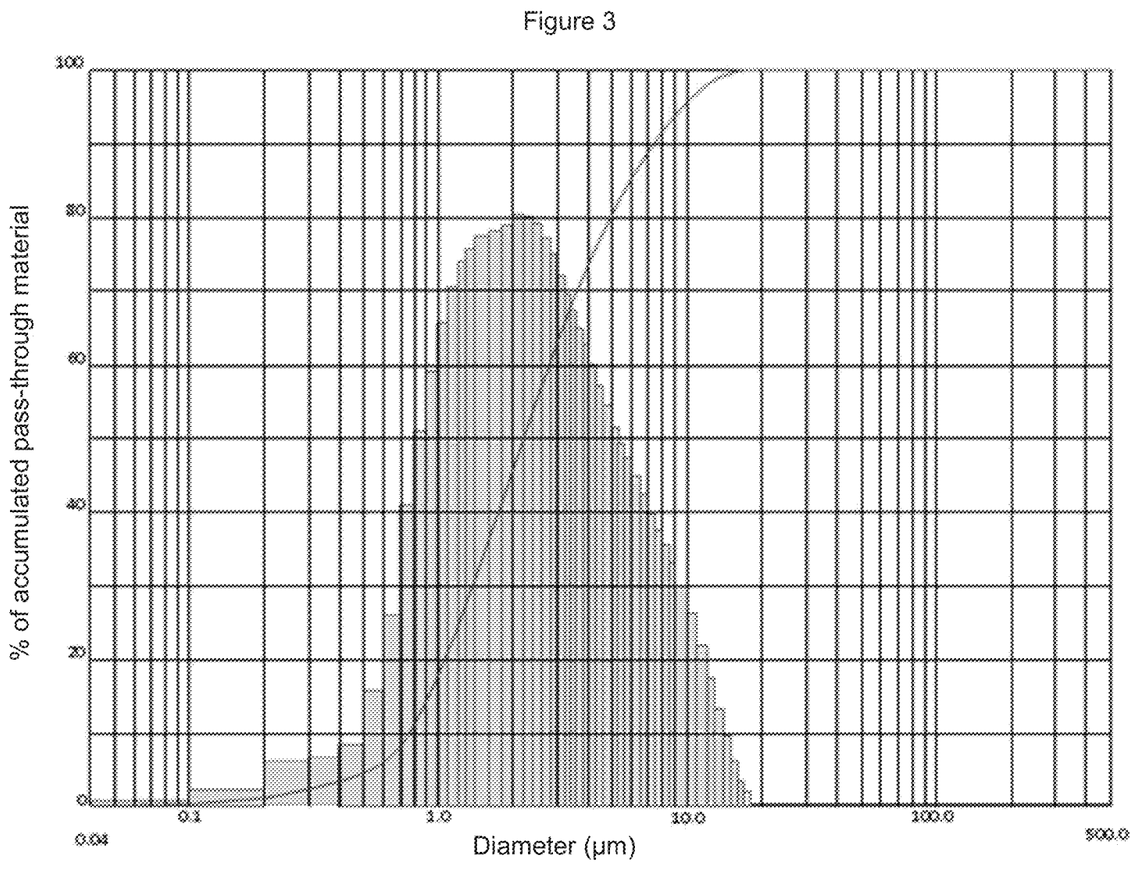
FIG. 3 presents an example of a distribution curve of the particle size of the treated dregs of the invention.

The distribution of particle size of the dregs at entry to the process is 90% passing at 4 mm and 50% passing at 1 mm at entry to the process; that is, 90% of the entry material presents a size of less than 4 mm and half of the material presents a size of less than 1 mm, as presented in FIG. 2.

The dregs are micronized until the average particle size (d50) reaches from 2 to 45 micrometers and, preferably, the average particle size is from 10 to 15 micrometers.

With the micronizing of the dregs to an average particle size (d50), controlled and low, from 2 to 45 micrometers, preferably from 10 to 15 micrometers and, more preferably 10 micrometers, it is possible to obtain treated dregs that are effective as vulcanization activator that provide similar or enhanced properties to the rubber.

The variation in this average particle size range (d50) acts directly on the surface area of the product. Therefore, the bigger the surface area, the greater its effectiveness, because the greater the surface activity, the better the anchoring on the elastomer, facilitating the incorporation thereof and its action as vulcanization activator. Therefore, according to the micronization of the dregs, a variation in surface area is achieved of 2 to 18 $m^2/g$, preferably from 13 to 15 $m^2/g$, and even more preferably 15 $m^2/g$.

As the dregs have consistencies varying from 35 to 60%, particularly having an average consistency of 60%, before the micronizing process the residue must be dried so as to enable perfect comminution of these particles. The step (a) of drying is carried out by a dryer tunnel, rotary drum dryer (hot air or contact), or fluid bed dryer.

The step (b) of micronization is carried out using hammer mill, ball mill, rod mill, air jet mill, pendular mill, and/or long gap mill.

In an embodiment of the invention that the step (a) of drying can be carried out in the same equipment as that of the step of micronization (b), the equipment being, for example, the pendular mill, air jet mill or long gap mill.

The process conditions are as follows:
The drying capacity is from 60 to 6,000 kg $H_2O$/hour.
The operating power of the drying is from 11 to 700 kW.
The drier speed is 20 to 6,000 rpm for integrated dryers, and from 10 to 500 rpm for drum dryers.
The air flow of the dryer is from 500 to 15,000 $Nm^3$/hour.
The micronization capacity is 1,000 to 15,000 kg/hour.
The power consumption of the mill is from 100 to 1500 kWh.

The process of the invention is carried out through just these two steps and manages to provide dregs treated with suitable characteristics for application as vulcanization activator of rubbers. The treated dregs comprise the same composition as the dregs that enters the process, but attains a suitable particle size for use as vulcanization activator; that is, the composition of the treated dregs is, in % by mass based on the treated dregs: P.F.: 35 to 45; $SiO_2$: 0.5 to 2.0; $Al_2O_3$: 0.5 to 1.5; $Fe_2O_3$: 0.5 to 1.5; $TiO_2$: 0.0 to 1.0; CaO: 35 to 50; MgO: 2 to 20; $K_2O$: 0.0 to 1.0; $Na_2O$: 0.5 to 5.0; $P_2O_5$: 0.2 to 1.5; BaO: 0.0 to 0.2; SrO: 0.0 to 0.5; MnO: 0.1 to 2.0; and $SO_3$: 0.5 to 5.0.

For a perfect yield of the dregs as vulcanization activator, the particles thereof must be reduced to small sizes. That is, the treated dregs containing the composition specified above has an average particle size (d50) of 2 to 45 micrometers, preferably 10 to 15 micrometers, and even more preferably 10 micrometers; and a top cut (d97) from 10 to 200 micrometers, preferably 10 to 60 micrometers, and even more preferably 35 micrometers. Top cut (d97) means that 97% of the particles present a diameter less than a certain specified diameter.

With the particle size identified above, the treated dregs present a surface area of 2 to 18 $m^2/g$, preferably from 13 to 15 $m^2/g$, and even more preferably 15 $m^2/g$.

The invention also refers to the use of treated dregs as described above as vulcanization activator of rubber.

In the particle size range described above, the treated dregs is used in contents varying from 1 to 5 parts per 100 parts of elastomer in the composition of various types of rubber. Preferably, the treated dregs are used in contents of 2 parts per 100 parts of elastomer.

The rubber vulcanization process of the present invention comprises the step of adding a vulcanization activator to the elastomer to be vulcanized, wherein the vulcanization activator is the treated dregs as described above. The elastomer (or rubber) to be vulcanized is any known rubber, such as natural rubber, styrene butadiene rubber (SBR), ethylene-propylene dimer rubber (EPDM), polybutadiene rubber (BR); and nitrile rubber (NBR) such as, for example, acrylonitrile butadiene rubber and nitrile butadiene rubber.

In the rubber vulcanization process of the invention as set out above, 1 to 5 parts of the treated dregs per 100 parts of the rubber to be vulcanized are added, preferably 2 parts per 100 parts of elastomer.

The vulcanized rubber presents similar or enhanced properties in relation to those already known. The vulcanized rubber according to the invention comprises the following components, in % by mass based on the mass of the vulcanized rubber:

Elastomer: 100 parts
Zinc oxide: 0 to 5 parts
Stearin (Lubricant): 1 to 2 parts
Accelerators: 0.5 to 1.5 part
Treated dregs: 1 to 5 parts
Plasticizer: 8 to 12 parts
Antioxidant: 0.8 to 1.2 part
Carbon Black: 48 to 52 parts
Sulfur: 1 to 2 parts Examples of embodiments of the invention are set out below.

EXAMPLES

1. Process of Treating Dregs
1.1 Example with Saturated Steam Drum Dryer and Ball Mill 15000 kg of a residue of dregs coming from the clarification of the green liquor in the kraft process were dried using a saturated steam drum dryer mill. The following drying parameters were applied:
drying capacity: 2500 kg/h
operating power: 50 kW
drier speed: 20 rpm
heat consumption: 150 Kcal/kg
water evaporation: 1500 kg $H_2O$/h Thereafter, the process of micronization is carried out in accordance with the following parameters using a ball mill.
capacity: 5000 kg/h power consumption: 260 KWh speed: 200 rpm The dregs were ground until reaching a particle size of: average size (d50) of 10 micrometers; and top cut (d97) of 35 micrometers. The composition of the treated dregs at the end of the process was as follows, in % by mass based on the mass of the treated dregs:

| Component | % |
| --- | --- |
| P.F. | 40.90 |
| $SiO_2$ | 1.62 |
| $Al_2O_3$ | 0.82 |
| $Fe_2O_3$ | 0.92 |
| $TiO_2$ | 0.04 |
| CaO | 46.7 |
| MgO | 3.58 |
| $K_2O$ | 0.10 |
| $Na_2O$ | 1.77 |
| $P_2O_5$ | 0.57 |
| BaO | 0.08 |
| SrO | 0.28 |
| MnO | 0.61 |
| $SO_3$ | 1.61 |

1.2 Example with Long Gap Mill 15000 kg of a residue of dregs coming from the clarification of the green liquor in the kraft process were dried and ground using a long gap mill using a steam drum dryer mill. The following drying and micronization parameters were applied:

Drying conditions:

drying capacity: 5,000 kg/h operating power: 160 kW drier speed: 2500 rpm air flow of the dryer: 12,000 Nm3/h air temperature: 180° C.

water evaporation: 3000 kg H2O/h

Micronization conditions:

micronization capacity: 5,000 kg/h power consumption of the mill: 200 kWh

The dregs were ground until reaching a particle size of: average size (d50) of 5 micrometers; and top cut (d97) of 15 micrometers. The composition of the treated dregs at the end of the process was as follows, in % by mass based on the mass of the treated dregs: The composition obtained is that same as that of the preceding example.

2. Process of Vulcanizing Rubber Using Dregs as Vulcanization Activator

The treated dregs according to the process described in the invention was evaluated in the following types of rubbers (or elastomers): NR, SBR, NBR, and EPDM; and in partial substitution of the zinc oxide up to 40%.

The formulations used for the vulcanization of the elastomers are set out below. Each formulation is subject to the respective vulcanization and should therefore be the final formulation of each vulcanized rubber. The vulcanization conditions for all the examples presented below were: temperature of 170° C. for a time of 12 minutes.

2.1 Vulcanization of NR

The table below expresses a comparison between the formulations of the rubbers NR vulcanized without and with treated dregs, in parts per hundred of rubber

| Raw Materials | Amount (parts per 100 parts of elastomer) without treated dregs | Amount (parts per 100 parts of elastomer) with treated dregs |
| --- | --- | --- |
| Rubber natural | 100.0 | 100.0 |
| Zinc oxide | 5.0 | 3.0 |
| Stearin | 1.0 | 1.0 |
| Vulkanox HS Antioxidant | 1.0 | 1.0 |
| Carbon Black N-550 | 50.0 | 50.0 |
| Paraffin oil | 10.0 | 10.0 |
| Treated dregs | 0 | 2.0 |
| Sulfur | 1.8 | 1.8 |
| Benzothiazyl disulfide (MBTS) | 1.5 | 1.5 |
| Tetramethylthiuram disulfide (TMTD) | 0.8 | 0.8 |
| TOTAL | 171.1 | 171.1 |

The properties of the vulcanized NR rubbers obtained are set out below:

| Property | | without treated dregs | with treated dregs |
| --- | --- | --- | --- |
| Rheometric curve | T1* (start-min/sec) | 56 | 48 |
| | T90** (start-min/sec) | 1.36 | 1.24 |
| Type A Shore Hardness | Before ageing (70 H/100° C.) | 62 | 62 |
| | After ageing (70 H/100° C.) | 67 | 68 |
| Tensile strength (MPa) | Before ageing (70 H/100° C.) | 19.05 | 19.12 |
| | After ageing (70 H/100° C.) | 13.84 | 11.23 |
| Elongation at fracture (%) | Before ageing (70 H/100° C.) | 319.7 | 355.3 |
| | After ageing (70 H/100° C.) | 218.8 | 179 |
| Variations of hardness, tensile strength and elongation after 70 H*/100° C. | Δ Type A Shore Hardness | 5 | 6 |
| | Δ Tensile strength (%) | −27.35 | −41.26 |
| | Δ Elongation at fracture (%) | −31.56 | −49.62 |
| | Tear resistance (N/mm) | 37.83 | 30.99 |
| | Resistance to abrasion (mm³) | 159.01 | 155.18 |
| | Density (g/cm³) | 1.11 | 1.11 |
| | Differential pressure control (DPC) (22 H/100° C.) - (%) | 31.03 | 22.53 |
| | Resilience (%) | 63 | 62 |

*T1 = Initial vulcanization time
**T90 = Time in which vulcanization is complete
*** Ageing time = 70 hours The comparison reveals that the vulcanized NR rubber obtained using dregs presents: better rheometric curve, both at the start of the process and at the end of the process; similar type A hardness before and after ageing; similar tensile strength before ageing; better elongation at fracture before ageing; similar Δ hardness; better resistance to abrasion; equal density after 70 h/100° C.; much better DPC (22 h/100° C.); and similar resilience.

2.2 Vulcanization of the SBR

The table below expresses a comparison between the formulations of the vulcanized SBR rubbers without and with treated dregs, in parts per hundred of rubber (Part per Hundred Rubber—PHR).

| Raw Materials | Amount (PHR) without treated dregs | Amount (PHR) with treated dregs |
|---|---|---|
| SBR 1502 | 100.0 | 100.0 |
| Zinc oxide | 5.0 | 3.0 |
| Stearin | 1.0 | 1.0 |
| Vulkanox HS Antioxidant | 1.0 | 1.0 |
| Carbon Black N-550 | 50.0 | 50.0 |
| Paraffin oil | 10.0 | 10.0 |
| Treated Dregs | 0 | 2.0 |
| Sulfur | 1.8 | 1.8 |
| Benzothiazyl disulfide (MBTS) | 1.5 | 1.5 |
| Tetramethylthiuram Disulfide (TMTD) | 0.8 | 0.8 |
| TOTAL | 171.1 | 171.1 |

The properties of the vulcanized SBR rubbers obtained are set out below:

| | Property | without treated dregs | with treated dregs |
|---|---|---|---|
| Rheometric curve | T1* (start-min/sec) | 1.26 | 1.23 |
| | T90** (start-min/sec) | 3.41 | 3.2 |
| Type A Shore Hardness | Before ageing (70 H/100° C.) | 66 | 67 |
| | After ageing (70 H/100° C.) | 71 | 72 |
| Tensile strength (MPa) | Before ageing (70 H/100° C.) | 14.41 | 14.64 |
| | After ageing (70 H/100° C.) | 14.04 | 12.85 |
| Elongation at fracture (%) | Before ageing (70 H/100° C.) | 226 | 224.4 |
| | After ageing (70 H/100° C.) | 163.7 | 154.1 |
| Variations of hardness, tensile strength and elongation after 70 H*/100° C. | Δ Type A Shore Hardness | 5 | 5 |
| | Δ Tensile strength (%) | −2.57 | −12.13 |
| | Δ Elongation at fracture (%) | −27.57 | −31.33 |
| | Tear resistance (N/mm) | 28.37 | 28.13 |
| | Resistance to abrasion (mm³) | 92.8 | 105.6 |
| | Density (g/cm³) | 1.13 | 1.13 |
| | Differential pressure control (DPC) (22 H/100° C.) - (%) | 15.36 | 10.83 |
| | Resilience (%) | 52 | 53 |

*T1 = Initial vulcanization time
**T90 = Time in which vulcanization is complete
*** Ageing time = 70 hours The comparison revealed that the vulcanized SBR rubber obtained using dregs presents: better rheometric curve, both at the start of the process and at the end of the process; similar type A hardness before and after ageing; similar tensile strength before ageing; similar elongations at fracture before and after ageing; equal Δ hardness; similar Δ elongation at fracture; similar tear resistance; similar resistance to abrasion; equal density after 70 h/100° C., better DPC (22 h/100° C.), and similar resilience.

2.3 Vulcanization of NBR

The table below expresses a comparison between the formulations of the vulcanized NBR rubbers with and without treated dregs, in parts per hundred of rubber (Part per Hundred Rubber—PHR).

| Raw Materials | Amount (PHR) without treated dregs | Amount (PHR) with treated dregs |
|---|---|---|
| NBR - N615 B | 100.0 | 100.0 |
| Zinc oxide | 5.0 | 3.0 |
| Stearin | 1.0 | 1.0 |
| Vulkanox HS Antioxidant | 1.0 | 1.0 |
| Carbon Black N-550 | 50.0 | 50.0 |
| DOA oil (dioctyl of adipate) - Plasticizer | 10.0 | 10.0 |
| Treated dregs | 0 | 2.0 |
| Sulfur | 1.8 | 1.8 |
| Benzothiazyl disulfide (MBTS) | 1.5 | 1.5 |
| Tetramethylthiuram Disulfide (TMTD) | 0.8 | 0.8 |
| TOTAL | 171.1 | 171.1 |

The properties of the vulcanized NBR rubbers obtained are set out below:

| | Property | without treated dregs | with treated dregs |
|---|---|---|---|
| Rheometric curve | T1* (start-min/sec) | 1.10 | 1.05 |
| | T90** (start-min/sec) | 2.07 | 2.04 |
| Type A Shore Hardness | Before ageing (70 H/100° C.) | 69 | 69 |
| | After ageing (70 H/100° C.) | 74 | 74 |
| Tensile strength (MPa) | Before ageing (70 H/100° C.) | 18.21 | 17.92 |
| | After ageing (70 H/100° C.) | 19.55 | 19.08 |
| Elongation at fracture (%) | Before ageing (70 H/100° C.) | 286.1 | 290.1 |
| | After ageing (70 H/100° C.) | 223 | 235.7 |
| Variations of hardness. tensile strength and elongation after 70 H*/100° C. | Δ Type A Shore Hardness | 5 | 5 |
| | Δ Tensile strength (%) | 7.36 | 6.47 |
| | Δ Elongation at fracture (%) | −22.05 | −18.75 |
| | Tear resistance (N/mm) | 38.14 | 38.52 |
| | Resistance to abrasion (mm³) | 80.73 | 60.02 |
| | Density (g/cm³) | 1.18 | 1.17 |
| | Differential pressure control (DPC) (22 H/100° C.) - (%) | 26.19 | 14.97 |
| | Resilience (%) | 30 | 30 |

* T1 = Initial vulcanization time
**T90 = Time in which vulcanization is complete
*** Ageing time = 70 hours The comparison reveals that the vulcanized NBR rubber obtained using dregs presents: better rheometric curve, both at the start of the process and at the end of the process; equal type A hardness before and after ageing; similar tensile strength before and after ageing; similar elongations at fracture before and after ageing; equal Δ hardness; similar Δ tensile strength; similar Δ elongation at fracture; similar tear resistance; much better resistance to abrasion; similar density after 70 h/100° C.; much better DPC (22 h/100° C.); and equal resilience.

2.4 Vulcanization of the EPDM

The table below expresses a comparison between the formulations of the vulcanized EPDM rubbers without and with treated dregs, in parts per hundred of rubber (Part per Hundred Rubber—PHR).

| Raw Materials | Amount (PHR) without treated dregs | Amount (PHR) with treated dregs |
|---|---|---|
| EPDM 4703 | 100.0 | 100.0 |
| Zinc oxide | 5.0 | 3.0 |
| Stearin | 1.0 | 1.0 |
| Vulkanox HS Antioxidant | 1.0 | 1.0 |
| Carbon Black N-550 | 50.0 | 50.0 |
| Paraffin oil | 10.0 | 10.0 |
| Treated dregs | 0 | 2.0 |
| Sulfur | 1.8 | 1.8 |
| Benzothiazyl disulfide (MBTS) | 1.5 | 1.5 |
| Tetramethylthiuram disulfide (TMTD) | 0.8 | 0.8 |
| TOTAL | 171.1 | 171.1 |

The properties of the vulcanized EPDM rubbers obtained are set out below:

| Property | | without treated dregs | with treated dregs |
|---|---|---|---|
| Rheometric curve | T1* (start-min/sec) | 1.17 | 1.17 |
| | T90** (start-min/sec) | 4.54 | 4.59 |
| Type A Shore Hardness | Before ageing (70 H/100° C.) | 70 | 70 |
| | After ageing (70 H/100° C.) | 73 | 74 |
| Tensile strength (MPa) | Before ageing (70 H/100° C.) | 17.73 | 14.68 |
| | After ageing (70 H/100° C.) | 13.65 | 14.61 |
| Elongation at fracture (%) | Before ageing (70 H/100° C.) | 254.2 | 221.8 |
| | After ageing (70 H/100° C.) | 167.4 | 181.4 |
| Variations of hardness. Tensile strength and elongation after 70 H*/100° C. | Δ Type A Shore Hardness | 3 | 4 |
| | Δ Tensile strength (%) | −23.01 | −0.48 |
| | Δ Elongation at fracture (%) | −34.15 | −18.21 |
| | Tear resistance (N/mm) | 22.96 | 22.87 |
| | Resistance to abrasion (mm$^3$) | 90.52 | 102.85 |
| | Density (g/cm$^3$) | 1.07 | 1.07 |
| | Differential pressure control (DPC) (22 H/100° C.) - (%) | 48.14 | 49.69 |
| | Resilience (%) | 57 | 57 |

*T1 = Initial vulcanization time
**T90 = Time in which vulcanization is complete
*** Ageing time = 70 hours The comparison reveals that the vulcanized EPDM rubber obtained using dregs presents: equal rheometric curve to the start of the process; similar rheometric curve at the end of the process; equal type A hardness before ageing; similar type A hardness after ageing; better tensile strength after ageing; better elongation at fracture after ageing; similar Δ hardness; much better Δ tensile strength; much better Δ elongation at fracture; similar tear resistance; similar resistance to abrasion; equal density after 70 h/100° C.; similar DPC (22 h/100° C.); and equal resilience.

The objective of the present invention is achieved through the development of the simple process for treating dregs, which provides treated dregs suitable for application to the vulcanization activator of rubbers, replacing the zinc oxide, and provides rubbers with similar or enhanced properties in comparison with those already known.

The advantages of the process developed for treating dregs and the application thereof in rubber vulcanization processes represent adequate and conscious usage of a subproduct made of cellulose and the consequent valuation thereof. For the manufacturers of rubber articles, the use of treated dregs as vulcanization activator is also noteworthy, since a competitive product (dregs) is provided, presenting easy incorporation into the rubber compounds, lower environmental impact and also a gain in productivity since it promotes more efficient vulcanization. Therefore, the present invention provides a highly sustainable and beneficial product for the cellulose industry and rubber industry.

Having described an example of a preferred embodiment, it should be understood that the scope of the present invention covers other possible variations, and is only limited by the content of the accompanying claims, potential equivalents being included therein.

The invention claimed is:

1. A rubber vulcanization process, comprising the step of adding a vulcanization activator to the rubber to be vulcanized, wherein the vulcanization activator is treated dregs that comprise an average particle size (d50) from 2 to 45 micrometers, and comprise, in % by mass based on the treated dregs:
   Loss on Ignition (LOI): 35 to 45;
   $SiO_2$: 0.5 to 2.0;
   $Al_2O_3$: 0.5 to 1.5;
   $Fe_2O_3$: 0.5 to 1.5;
   $TiO_2$: 0.0 to 1.0;
   CaO: 35 to 50;
   MgO: 2 to 20;
   $K_2O$: 0.0 to 1.0;
   $Na_2O$: 0.5 to 5.0;
   $P_2O_5$: 0.2 to 1.5;
   BaO: 0.0 to 0.2;
   SrO: 0.0 to 0.5;
   MnO: 0.1 to 2.0; and
   $SO_3$: 0.5 to 5.0.

2. The rubber vulcanization process according to claim 1, wherein the rubber is natural rubber, styrene butadiene rubber (SBR), ethylene-propylene dimer rubber (EPDM), polybutadiene rubber (BR), or nitrile rubber (NBR).

3. The rubber vulcanization process according to claim 1, wherein 1 to 5 parts of the treated dregs are added per 100 parts of the rubber to be vulcanized.

4. Vulcanized rubber obtained according to the process of claim 1, comprising, in % by mass based on the mass of the vulcanized rubber:
   Elastomer: 100 parts;
   Zinc oxide: 0 to 5 parts;
   Stearin (Lubricant): 1 to 2 parts;
   Accelerators: 0.5 to 1.5 part;
   Treated dregs obtained according to the process of claim 1: 1 to 5 parts;
   Plasticizer: 8 to 12 parts;
   Antioxidant: 0.8 to 1.2 part;
   Carbon black: 48 to 52 parts; and
   Sulfur: 1 to 2 parts.

5. Means for carrying out the rubber vulcanization process according to claim 1, wherein the means comprise
   (i) providing one between a dryer tunnel, a rotary drum dryer or a fluid bed dryer, wherein the one between a dryer tunnel, a rotary drum dryer or a fluid bed dryer is configured to enable the drying of the dregs generated in a clarification of green liquor in a kraft process of obtaining cellulose; and (ii) providing one between a hammer mill, a ball mill, a rod mill, an air jet mill, a pendular mill, or a long gap mill, wherein the one between a hammer mill, a ball mill, a rod mill, an air jet mill, a pendular mill, or a long gap mill is configured to enable a micronization of the dregs generated in the clarification of green liquor in the kraft process of obtaining cellulose, dried in step (i), until reaching an average particle size (d50) from 2 to 45 micrometers.

6. Means for carrying out the rubber vulcanization process, according to claim 5, wherein a drying capacity is from 60 to 6,000 kg $H_2O$/hour.

7. Means for carrying out the rubber vulcanization process, according to claim 5, wherein an operating power of the drying is from 11 to 700 kW.

8. Means for carrying out the rubber vulcanization process, according to claim 5, wherein a drier speed is 20 to 6,000 rpm for integrated dryers and from 10 to 500 rpm for drum dryers.

9. Means for carrying out the rubber vulcanization process, according to claim 5, wherein the air flow of the dryer is from 500 to 15,000 $Nm^3$/hour.

10. Means for carrying out the rubber vulcanization process, according to claim 5, wherein the micronization capacity is 1,000 to 15,000 kg/hour.

11. Means for carrying out the rubber vulcanization process, according to claim 5, wherein a power consumption of the one between a hammer mill, a ball mill, a rod mill, an air jet mill, a pendular mill, or a long gap mill is from 100 to 1500 kWh.

* * * * *